United States Patent [19]
Llerena et al.

[11] Patent Number: 5,021,722
[45] Date of Patent: Jun. 4, 1991

[54] COMPOSABLE PROTECTION AND CONTROL APPARATUS FOR MOTORS

[75] Inventors: Laurent Llerena, Bougival; Michel Loiselay, Palaiseau, both of France

[73] Assignee: Telemecanique, France

[21] Appl. No.: 481,535

[22] Filed: Feb. 20, 1990

[30] Foreign Application Priority Data

Feb. 21, 1989 [FR] France ................................. 89 02216

[51] Int. Cl.⁵ .............................................. H02P 7/00
[52] U.S. Cl. ..................................... 318/434; 318/634
[58] Field of Search ............... 318/434, 634, 663, 696, 318/87, 799, 603, 618; 388/903, 902, 904, 934; 361/23, 25, 91, 92, 103, 24, 30, 31

[56] References Cited
U.S. PATENT DOCUMENTS 4,717,924 1/1988 Henry et al. .......................... 361/25

Primary Examiner—Vit W. Miska
Assistant Examiner—A. Jonathan Wysocki
Attorney, Agent, or Firm—William A. Drucker

[57] ABSTRACT

A composable protection and control apparatus for motors is provided with a power case including semiconductor switches controlling the switching on and off of the power of the phase currents as well as a detector for detecting all or part of these currents and a control module which can be removably fixed to said case and be connected to the switches and to the detector. This module contains a logic circuit for managing the switches which includes a circuit for identifying the size of the power case and a circuit for selecting the working characteristics of the apparatus as a function of this size.

6 Claims, 1 Drawing Sheet

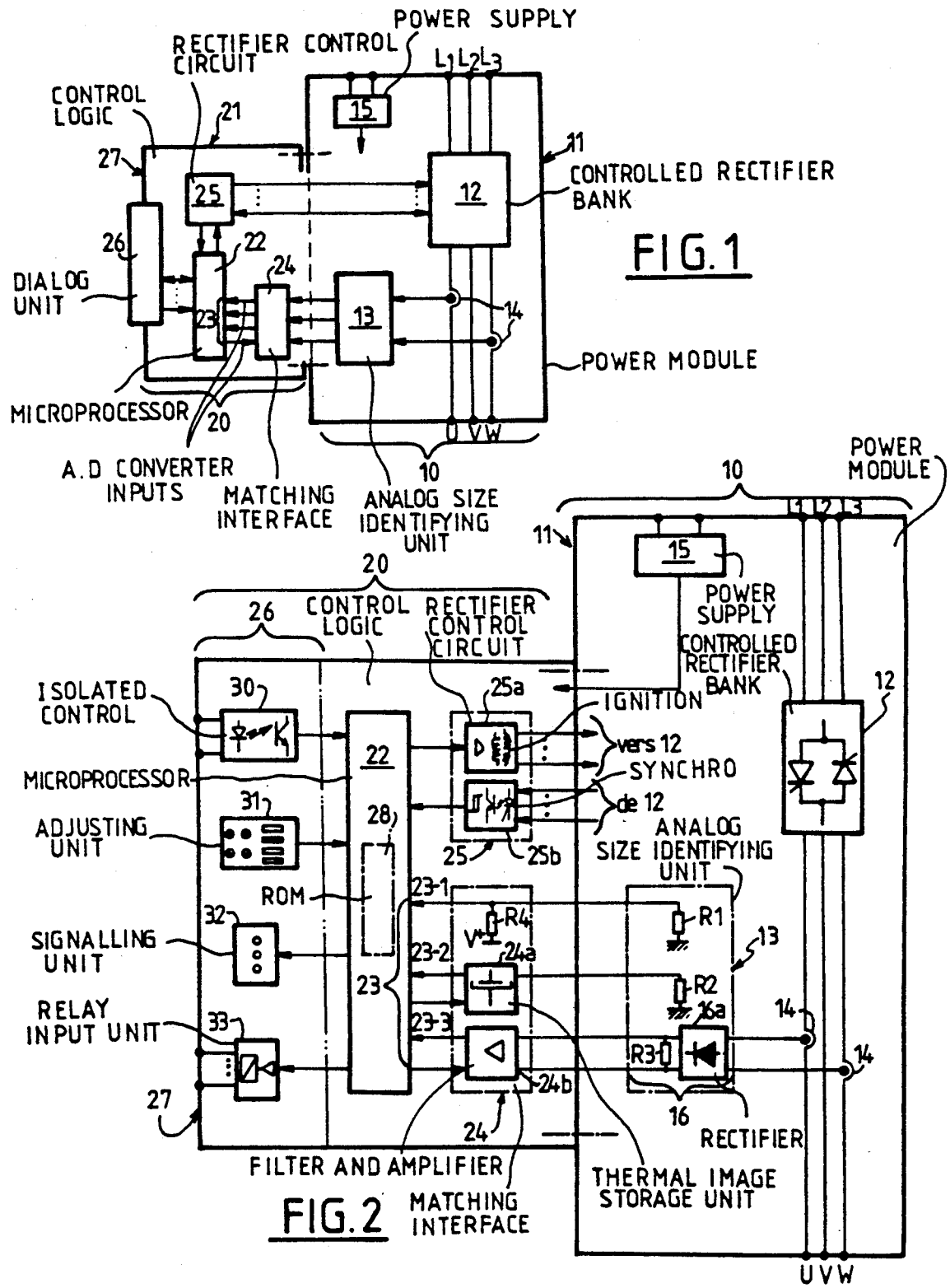

COMPOSABLE PROTECTION AND CONTROL APPARATUS FOR MOTORS

BACKGROUND OF THE INVENTION

The present invention relates to composable protection and control apparatus for motors, comprising a power assembly and an interchangeable control module associated with said assembly.

Protection and control apparatus for motors, such as starting or starting-slowing down devices, associated or not with thermal protection devices, generally comprise in a case:

static power switches which control switching on or off of the phase currents of the motor, current sensors associated with at least one of the phases to be controlled, 1. a control circuit for switching on—and, as required switching off—the power switches as a function of operating or stopping orders coming, for example, from a normal command or a command for opening following an electric defect detected particularly from current intensity data delivered by the current sensors.

Such apparatus are sized so as to be associated with motors of given power. To provide a range of apparatus which can be associated with a wide range of motors, the manufacturer of such apparatus must split his range into several sizes, which requires the fitting and assembly of as many separate apparatus.

The purpose of the invention is to simplify the manufacture storage and maintenance of protection and control apparatus for motors of the above described type by using a control module which is common to the apparatus of different sizes of a range and by appropriate arrangement of the control module and the different power assemblies to which it can be coupled.

SUMMARY OF THE INVENTION

According to the invention, the above described apparatus comprises:

a power assembly comprising a case and, in this case, semiconductor power switches controlling the switching on and off of the phase currents as well as current sensors associated with all or part of the phases to be controlled and protected, and a control module common to the apparatus of different sizes of a range and able to be removably fixed to the case of the power assembly, the control module being then connected to the current sensors and to the power switches and comprising a logic which manages particularly the control of the power semiconductors, this logic being able to be connected, via an A-D converter, to a sizing means belonging to the power assembly for identifying the size of the latter, and being adapted for reading the value of the sizing means and, depending on the value read, for selecting the working characteristics of the apparatus corresponding to the size of the power assembly.

The manufacture, storage and maintenance of the different apparatus of the same range are therefore simplified since the same control module can be coupled to the different power assemblies of the range.

The control module advantageously comprises as logic a microprocessor which has an ROM comprising a table of the working characteristics of the apparatus.

The sizing means preferably comprises a sizing resistor with identification function. It may further comprise a resistor in the connection between the current sensors and the A-D converter, as well as a resistor associated with a thermal image safeguard means.

BRIEF DESCRIPTION OF THE DRAWINGS

Other features and advantages of the invention will be clear from the following description, with reference to the accompanying drawings in which:

FIG. 1 illustrates schematically a composable protection and control apparatus for motors, in accordance with the invention;

FIG. 2 schematically and in greater detail the apparatus of FIG. 1.

DESCRIPTION OF THE PREFERRED EMBODIMENT

The apparatus shown in FIG. 1 is a progressive starting-slowing down device for a three phase asynchronous motor. It could also be another apparatus whose purpose is to control and protect a mono or multiphase load.

The apparatus comprises a power assembly 10 and a control module 20. The power assembly has a case 11 on or in which is removably fixed a case 21 of the control module. The latter is a standard device common to the apparatus of different sizes—for example for motors from a few kilowatts to a few tens of kilowatts—of the same range.

Case 11 houses an assembly of static switches 12 connected on the one hand to mains terminals L1, L2, L3 and on the other to the load terminals U, V, W for switching on and off the corresponding current paths L1U, L2V, L3W as a function of the signals generated by microprocessor 22 situated in the control module.

Case 11 also houses an analog sizing means 13 connected to A-D converter inputs 23 of the microprocessor through a processing and/or matching interface 24. The connection between the sizing means 13 and the microprocessor may of course be made via an A-D converter separate from the microprocessor.

The sizing means 13 are connected to usual current sensors 14 delivering signals representative of the intensity in at least one phase conductor, in the present case in two phase conductors. Case 11 also houses a power supply 15 for feeding the members of the control module.

The control module 20 comprises, in addition to the microprocessor 22 and interface 24, a control circuit 25 for the static switches of assembly 12. In the present embodiment, the switches are thyristors whose control circuit 25 is managed by the microprocessor 22 in particular for progressive starting and slowing down of the motor, particularly as a function of desired acceleration and deceleration ramps.

The control module 20 comprises a dialog assembly 26 having input, output and signalling elements which are preferably visible and/or accessible from a front face 27 of case 21. The microprocessor 22 is connected by conductors and appropriate connection means to the sizing means 13 via the interface 24 as well as to the control circuit 25 and to the dialog assembly 26 and it is adapted so as to read the value of at least one sizing element contained in means 13 and, depending on the value read, to choose in a table 28 (FIG. 2) for example in a ROM, working characteristics of the apparatus corresponding to the size of the power assembly 10.

FIG. 2 relates more particularly to the sizing means 13. These means comprise three sizing elements formed very simply by resistors respectively R1, R2 and R3.

The sizing resistor R1 is mounted in a bridge with a fixed resistor R4 connected to a potential V+ and is situated in the interface 24 so as to deliver to an A-D converter input 23-1 of the microprocessor an analog signal identifying the size of the power assembly 10.

The sizing resistor R2 is connected to a means 24a storing the thermal state of the motor, for example of the type described in U.S. Pat. No. 4,717,984 of the same assignee, so as to store this thermal state and restore it to an A-D input 23-2 of the microprocessor when requested to do so by the latter, for example at the time of re-establishing the power supply after a power cut of the phases of the motor. Resistor R2 thus makes it possible to fix a time constant simulating, in a sufficiently approximate way, that of the cooling of a motor of corresponding size.

The sizing resistor R3 is situated in a matching circuit 16 comprising a rectifier 16a to which the current sensors 14 are connected for transmitting to a filtering and amplifying circuit 24 b, provided in the interface 24, a value compatible with a respective A-D input 23-3 of the micropressor, whatever the size of the power assembly 10.

In addition, the control circuit 25 is formed of ignition circuits 25a and synchronization circuits 25 b associated with the thyristors of assembly 12.

The dialog assembly 26 comprises, more precisely, an isolated control member 30, a removable adjusting plate 31, LEDs 32 for signalling and relay output members 33, these different elements being connected to the microprocessor 22.

What is claimed is:

1. A system for supplying a controlled current to alternating current motors of various sizes and working characteristics, said system comprising:
   (i) a first case housing including,
      a bank of semiconductor controlled rectifiers;
      input means connecting said bank to mains terminals;
      output means connecting said bank to motor terminals, said output means including current sensors;
      analog size identifying means for generating identifying signals indicative of the size of the motor, and
      power supply circuit means;
   (ii) a second case removably secured to said first case, said second case housing including,
      first circuit means for controlling the respective semiconductor controlled rectifiers of said bank as a function of order signals;
      processor means for generating said order signals as a function of said identifying signals, said processor means being connected to said first circuit means, and
      analog-to-digital converter means connecting said size identifying means to said processor means,
      said first circuit means, processor means and analog-to-digital converter means being connected to said power supply cirucit means.

2. A system as claimed in claim 1, wherein said processor means include a microprocessor and a ROM comprising a table in which the working characteristics of the respective motors are stored.

3. A system as claimed in claim 1, wherein said analog size identifying means comprise a resistor having a resistance indicative of the motor size.

4. A system as claimed in claim 1, further comprising thermal image storage means for generating further signals indicative of the thermal state of the motor and further analog-to-digital converter means connecting said thermal image storage means to said processor means, said processor means being adapted for generating said order signals as a function both of the identifying signals and of the further signals.

5. A system as claimed in claim 1, further comprising electric defect indicator means connected to said current sensors for generating defect signals and further analog-to-digital converter means connecting said electric defect indicator means to said processor means, said processor means being adapted for generating said order signals as a function both of the identifying signals and of the defect signals.

6. A system as claimed in claim 5, wherein said electric defect indicator means include rectifier means and a sizing resistor connected across said rectifier means.

* * * * *